United States Patent [19]

Pierik

[11] Patent Number: 4,973,484

[45] Date of Patent: Nov. 27, 1990

[54] ROLLER MILL GRAIN PREHEATING

[75] Inventor: Henry A. Pierik, Pacifica, Calif.

[73] Assignee: California Pellet Mill Company, San Francisco, Calif.

[21] Appl. No.: 366,272

[22] Filed: Jun. 12, 1989

Related U.S. Application Data

[63] Continuation of Ser. No. 138,634, Dec. 28, 1987, now abandoned.

[51] Int. Cl.$^5$ .............................................. A23K 1/00
[52] U.S. Cl. ..................................... 426/457; 426/461; 426/462; 426/623; 426/807; 34/35; 34/86
[58] Field of Search ............... 426/807, 457, 459, 461, 426/462, 623, 630; 34/35, 86

[56] References Cited

U.S. PATENT DOCUMENTS

| | | | |
|---|---|---|---|
| 3,342,607 | 9/1967 | Hickey | 426/461 |
| 4,044,820 | 8/1977 | Nobles | 34/86 |
| 4,253,825 | 3/1981 | Fasano | 34/86 |
| 4,284,476 | 8/1981 | Wagener et al. | 34/86 |
| 4,446,631 | 5/1984 | Batterton et al. | 34/86 |
| 4,676,007 | 6/1987 | Good | 34/35 |
| 4,699,797 | 10/1987 | Fast | 426/508 |

FOREIGN PATENT DOCUMENTS 0880400  11/1981  U.S.S.R. .............................. 425/457

Primary Examiner—R. B. Penland
Attorney, Agent, or Firm—Walter C. Vliet; Arthur N. Trausch

[57] ABSTRACT

An energy efficient steam rolled grain mill includes a preheater chamber, a steam chest, a roller mill and a cooler and dryer chamber. The cooler and dryer chamber is in direct head exchange relationship with the preheater chamber.

4 Claims, 2 Drawing Sheets

4,973,484

ROLLER MILL GRAIN PREHEATING

This application is a continuation of application Ser. No. 07/138,634, filed Dec. 28, 1987, now abandoned.

BACKGROUND OF THE INVENTION

This invention relates to steam rolled grain. More particularly, this invention is a new system and method for preheating unprocessed grain before it is steamed and flaked in a roller mill.

There are several advantages to feeding livestock steam rolled grain versus the same formula of unprocessed grain. In certain feeds, the steam conditioning process creates chemical changes in the feed, making it possible for animals to more rapidly digest and convert the feed to weight. Rolling the grain or flaking also makes the feed more readily digestible by the animal. Additionally, the steaming process also reduces the bacteria that may be present in animal feeds, thus reducing disease such as salmonellosis in the animals.

It is very desirable to reduced the amount of energy used in the steaming process. Fuel costs for heating can be a large proportion of the operating costs. The cost benefit of feeding steam rolled grain to animals may be more than offset by inefficient operation of the heating system in the steam roller mill. Energy costs can be reduced by extracting and recovering heat from the process and limiting waste heat.

One method for preheating is to divert hot air from the exhaust stack to the steam generator. While this does reduce energy consumption, the overall system efficiency is raised very slight. Also, complicated heat exchange equipment is required.

The present invention is a more energy efficient system for producing steam rolled grain and a new method of making steam rolled grain or flakes. The system uses a more direct heat exchange relationship, that is transferring heat from the processed flakes through air to the unprocessed grain, and thus a more energy efficient process. Thus, there is a large saving in energy which increases the cost benefit of steam rolled grain.

SUMMARY OF THE INVENTION

It is accordingly an object of this invention to provide a preheating system which is capable of reducing the energy consumption of a steam roller grain processing unit.

It is another object of the invention to provide a system that will operate efficiently without excess energy consumption and extra processing equipment and steps.

It is a further object of the invention to provide a system that can be retrofit onto existing steam roller grain systems.

In general, the foregoing objects are obtained in a steam rolled grain processing unit including a grain preheater, a steam chest, a roller or flaking chamber, and a cooler-dryer for cooling and drying the flaked grain.

DETAILED DESCRIPTION OF THE INVENTION

Figure 1:
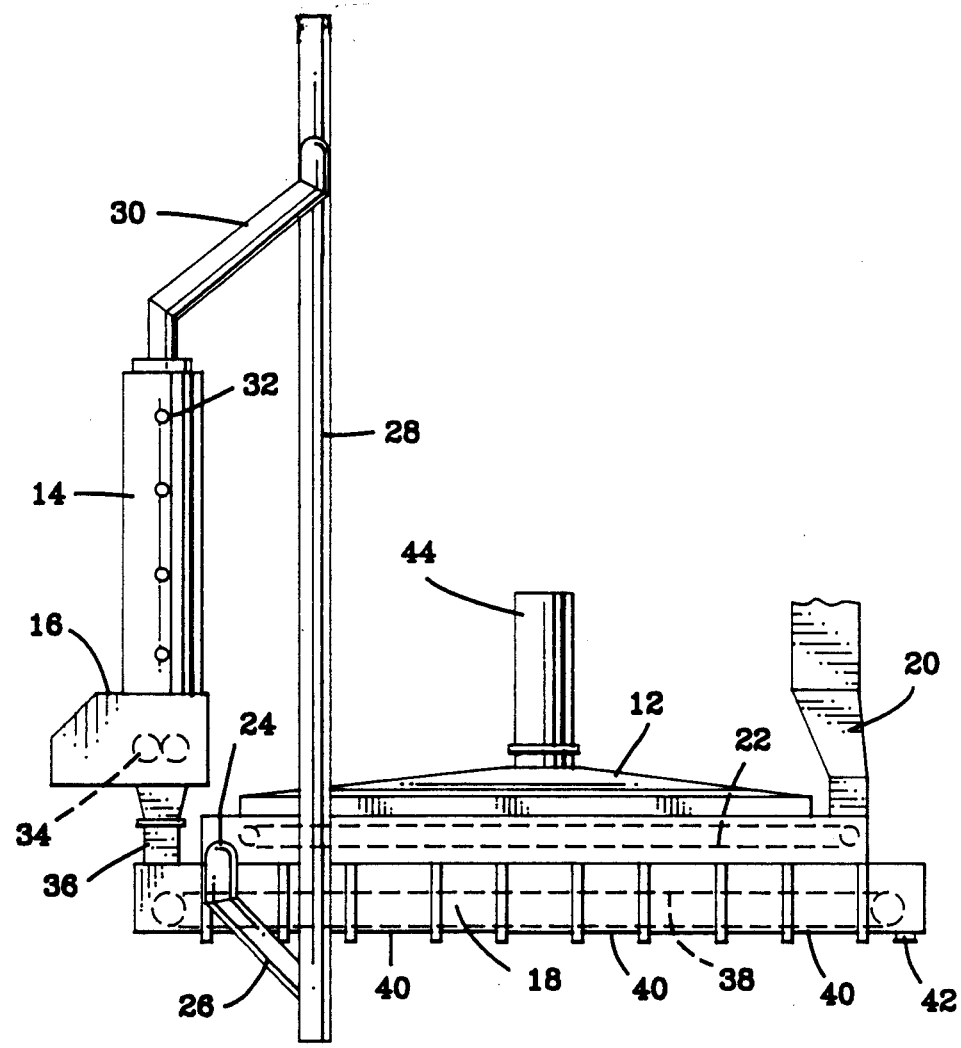
FIG. 1 is a plan view of a steam rolled grain processing system according to a first embodiment of the present invention.

Referring now to the drawings, wherein like referenced numerals designate identical or corresponding parts throughout the system used, and more particularly to FIG. 1, a preferred embodiment of the steam rolled grain processing system will now be described. In general, the system includes four main components: a preheater chamber 12, a steam chest 14, a roller chamber 16, and a cooler-dryer chamber 18.

Raw, unprocessed grain is fed into the preheater through grain inlet 20. The grain falls on a belt conveyor 22 and is conveyed through the preheater chamber. Typically, the preheating chamber is arranged horizontally and the belt conveyor is configured to allow heat exchange between the heated air in the preheater chamber and the grain on the conveyor belt. The conveyor may be of the louvered or perforated type.

After passing completely through the preheater, the now preheated grain exits through grain exit 24. The preheated grain is fed by gravity through the conduit 26 to a vertical extending pipe 28 which contains a bucket elevator. The bucket elevator lifts the warmed grain up and drops it into gravity conduit 30.

The preheated grain is fed into the steam chest 14 by means of gravity conduit 30. The grain moves slowly down through the steam chest where it is exposed to a 212° F. steam atmosphere. The grain is heated to release certain enzymes and also retains some moisture absorbed during the heating process. Steam is provided to the steam chest 14 by steam inlets 32 from a steam generator. The amount of steam supplied depends on the type of grain and processing.

Once the steamed grain has moved completely through the steam chest, it is fed to the roller mill 16 by a feeder. The feeder controls the retention time the grain is maintained in the steam chest. In the roller mill, the grain passes through rollers 34 and is flattened. Some heat by pressure is added at this point. From the rolling mill, the steam rolled or flaked grain falls into cooler conduit 36.

The air cooler and dryer 18 is used to remove some of the moisture and heat from the warm flakes. The removal of the moisture and heat is necessary to prevent mold or spoilage and to harden the flakes for conveying and handling with minimum breakage and minimum creation of fines.

Good drying and cooling requires adequate airflow and flake retention time in the cooler-dryer 18. To provide adequate retention time, the warm flakes are fed on to a belt conveyor 38 and are conveyed through the dryer. The conveyor may be louvered or perforated. The warm flakes on the belt are partially cooled and some of the moisture removed by the ambient air flow passing through the conveyor. The ambient air is introduced through the cooler-dryer by a plurality of ambient air inlets 40. As the ambient air enters the cooler-dryer, it flows past the warmed flakes to convection cool and dry the flakes. The airflow is heated by the heat and moisture taken from the warmed flakes. In the preferred embodiment, as shown in FIG. 1, this heat is used to preheat the raw, unprocessed grain that is moving in an opposite direction in the preheater chamber. The preheater chamber is immediately above and open to the cooler-dryer chamber.

Figure 2:
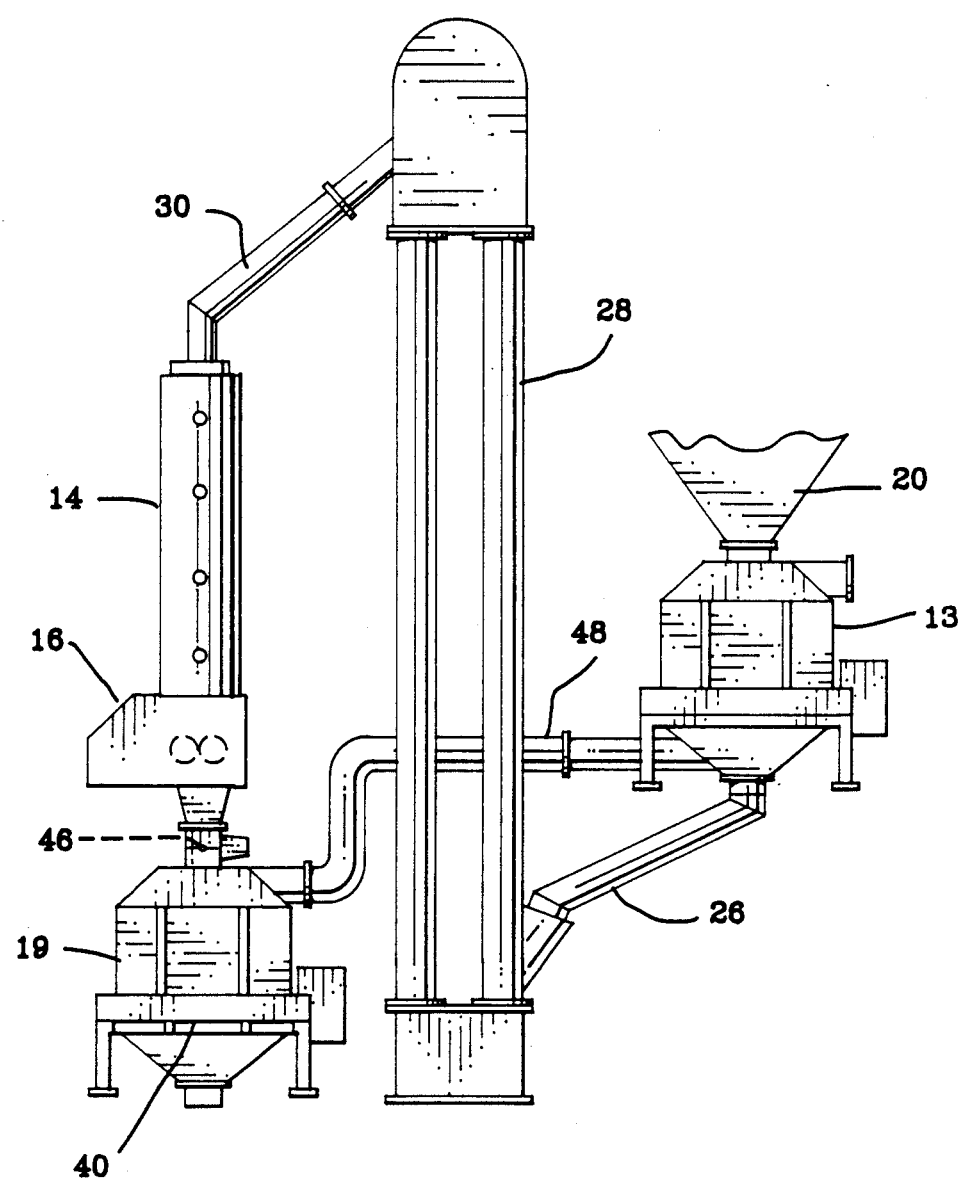
FIG. 2 is a plan view of a second embodiment of the present invention.

In other embodiments such as shown in FIG. 2, the heated air in the cooler-dryer may be collected and piped to a remote preheater for heating the unprocessed grain. FIG. 2 shows a counterflow preheater 13 and a counterflow cooler and dryer 19. Additionally, an air lock 46 is provided between the roller mill 16 and the cooler-dryer 19, and a heat conduit 48 is provided to transfer the heat to the remote preheater unit.

Referring again to FIG. 1, by the time the cooled flakes reach the end of the conveyor 38, they are fully conditioned. The flakes are dumped into chute 42 which takes them to a suitable storage area or to other processing steps such as bagging.

In the preferred embodiment of FIG. 1, the airflow path is provided from the ambient air inlets 40 at about 70° F., through the cooler-dryer chamber 18 and its conveyor belt 38. The air removes heat and moisture from the warm flakes which may initially be at 200+° F. and 18% moisture content. The heated air is at an average temperature of between 120° to 140° F. when it passes into the preheater chamber 12 and through the preheater conveyor 22 to preheat the unprocessed grain. The actual temperatures range across the preheater chamber in a temperature gradient from about 210° F. to about 70°.

When the grain reaches the elevators 28, it has been preheated to an average temperature of about 120° to 140° F. Thus, when the grain enters the steam chest, it only needs to be heated another 80° to 100° F. to reach the 212° F. steam atmosphere. Heat that normally would be exhausted provides a sizable energy savings over heating the grain from ambient temperature at the grain inlet.

Processed grain leaves the mill at about 70° F. and 14% moisture content. About 60% of the heat from the cooler-dryer can be recovered to preheat the new grain. The remaining air in the preheater is collected in chimney 44 and exhausted to the atmosphere.

Numerous modifications and variations of the present invention are possible in light of the above teachings. It is, therefore, to be understood that the invention may be practiced other than as specifically described herein and it is intended that the invention be limited only by the language of the following claims.

I claim:
1. In a method of producing steam rolled grain by:
   preheating grain;
   steaming the preheated grain;
   rolling the steamed grain;
   cooling and drying the rolled grain the improvement consisting essentially of
   utilizing the heat and moisture produced by the cooling and drying step for the preheating step.
2. The method of claim 1 wherein the heat produced by cooling and drying includes the heat produced by condensation as the moisture content of the rolled grain is reduced.
3. A mill for steaming and rolling grain, comprising in operating sequence: a preheater chamber having means for conveying grain such that the grain is exposed to a recovered preheating and moisturizing air flow; a steam chest for further heating and steaming the preheated and moisturized grain; a roller mill for rolling the steamed grain; a cooling and dryer chamber for cooling and drying the rolled grain; means for recovering in counterflow exchange heat and moisture from the grain in the cooling and dryer chamber; air flow means for conducting the recovered heat and moisture to the preheating and moisturizing air flow in the preheater chamber whereby the cooler and dryer chamber is in direct heat exchange relationship with the preheater chamber.
4. The mill of claim 3 wherein the heat recovering means includes means for recovering and moisturizing heat produced by condensation as the moisture content of the rolled grain is reduced.

* * * * *